May 31, 1966     H. H. ALBRO     3,253,449
APPARATUS FOR PREPARING LINED PIPING FLANGED PIPE JOINTS
Original Filed Oct. 5, 1961     3 Sheets-Sheet 1

INVENTOR
Henry H. Albro
BY W. E. Sherwood
ATTORNEY

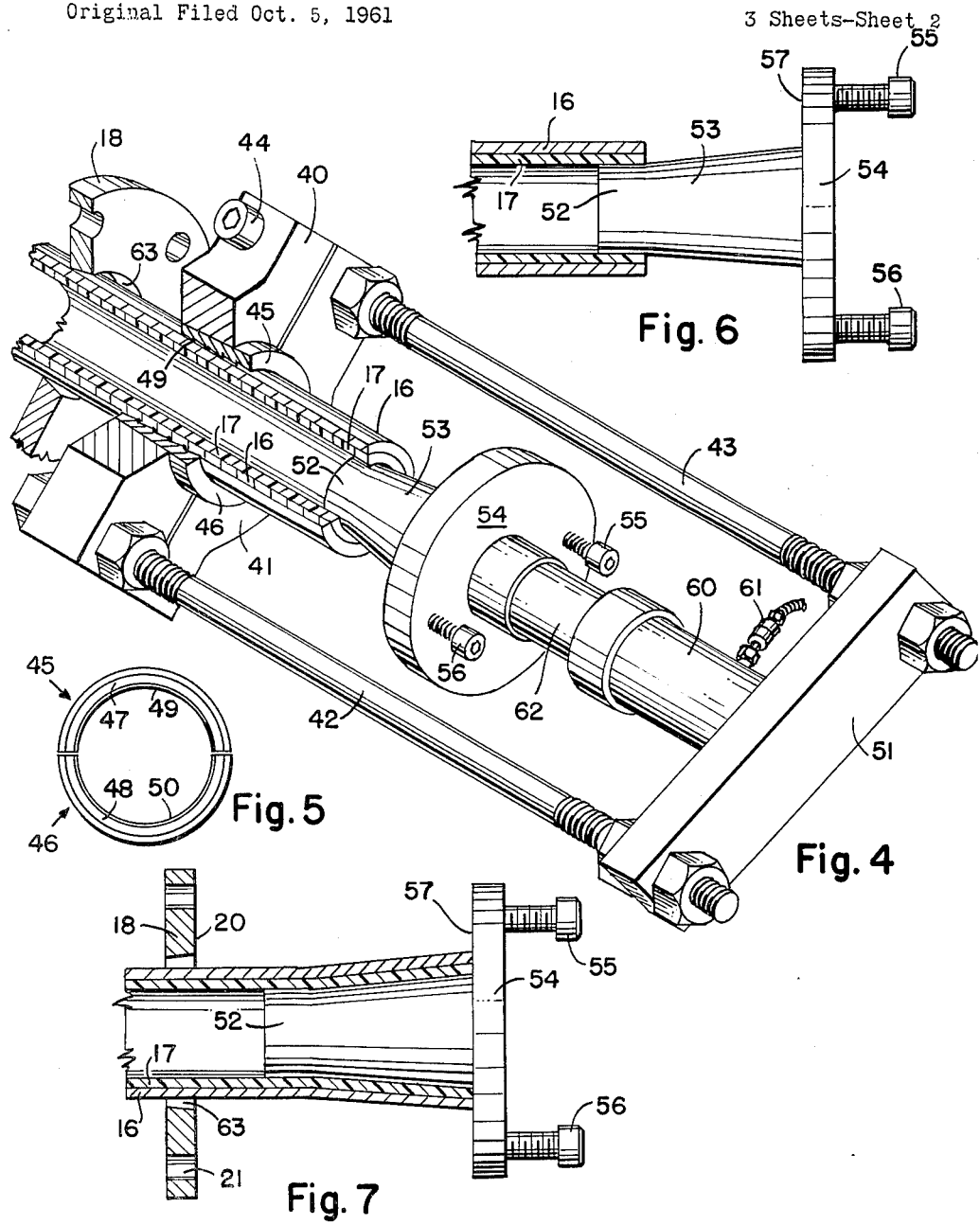

United States Patent Office 3,253,449
Patented May 31, 1966

3,253,449
APPARATUS FOR PREPARING LINED PIPING FLANGED PIPE JOINTS
Henry Hayward Albro, Louisville, Ky., assignor to Cabot Corporation, Boston, Mass., a corporation of Delaware
Original application Oct. 5, 1961, Ser. No. 146,066. Divided and this application Jan. 11, 1965, Ser. No. 424,794
4 Claims. (Cl. 72—316)

This application is a division of my copending application, Serial No. 146,066, filed October 5, 1961.

This invention relates to unobstructed, leak-proof, lined piping systems, and more particularly to an apparatus for preparing flanged connections of lined piping.

In the handling of flowable corrosive materials, it is customary to employ a metallic pipe lined with a corrosion-resistant plastic or the like and to connect such pipe to an adjacent pipe or to a lined pipe fitting by means of flanged couplings having a sealing means interposed therebetween.

When the coupling is to employ lined pipes flared at their ends and with sealing means such as suitably tapered plastic stub ends intended to be inserted therein for sealing purposes, splitting of the metallic pipe, damage to the pipe lining and separation of the lining from the pipe may occur during the flaring operation, unless careful precautions are taken. This flaring operation, which preferably should be capable of being conducted under field conditions, presents a difficult problem due to the inherent nature of the plastic lining and to its tendency to break its bond with the pipe, whether that bond is of a mechanical or a cemented nature. It is a purpose of this invention to overcome this problem in a simple and inexpensive manner and an object of the invention is to provide an improved apparatus for flaring the ends of plastic lined metallic pipes.

Other objects and advantages will become more apparent as the description proceeds and when considered in conjunction with the accompanying drawing in which:

FIG. 4 is a perspective view of the flaring apparatus in assembled position preparatory to its flaring movement, and with portions of the apparatus shown in section.

FIG. 5 is an end view of the two-part tapered collar taken from the smaller end and showing one of the serrated teeth in each part.

FIG. 6 is a side elevation view of the flaring plug inserted in the pipe to be flared and shown at the beginning of the flaring operation.

FIG. 7 is a side elevation of the flaring plug showing the position of the same within the pipe at the conclusion of the flaring operation.

In accordance with the invention, a simple and inexpensive apparatus for preparing flanged pipe joints for lined pipes, and involving the flaring of the ends of such pipe without damage to the pipe or to the lining thereof, is made available for use in the construction of unobstructed, leak-proof, lined piping systems.

Figure 1:
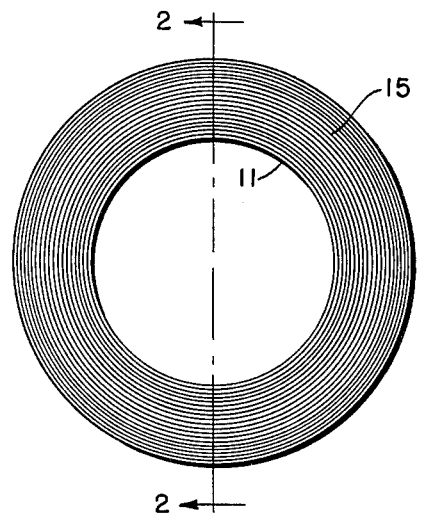
FIG. 1 is a front elevation view of a stub end pipe fitting adapted for bonding to the flared end of the lined pipe.
Figure 2:
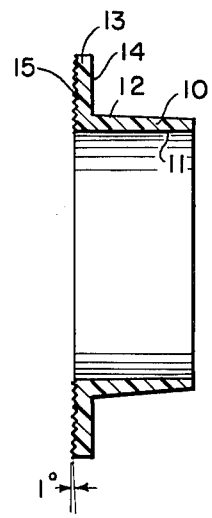
FIG. 2 is a sectional view taken on line 2—2 of FIG. 1.
Figure 9:
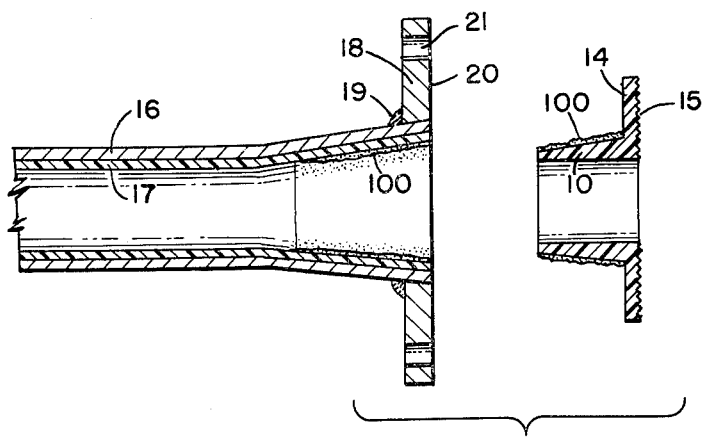
FIG. 9 is a longitudinal sectional view of the flared pipe end and the stub end fitting preparatory to insertion and bonding of the stub end within the pipe.

Referring first to FIGS. 1 and 2, a plastic stub and fitting of the type shown in the copending application of Carl B. McLaughlin, Serial No. 143,105, filed October 5, 1961 (now abandoned), and assigned to the assignee of the present invention, is employed in the pipe joint. This fitting may be formed of any of several known plastic materials, for example, unplasticized polyvinyl chloride, chlorinated polyethers, or the like, and may be shaped into the prescribed form by conventional molding or machining operations. The run portion 10 of the fitting (shown herein with an exaggerated wall thickness) has a cylindrical inner surface 11, with a diameter preferably equal to the normal inner diameter of the pipe lining with which the fitting is to be employed, and has a tapered outer surface 12 gradually diminishing along its length from a maximum adjacent its flanged portion to a minimum at the distal end of the run portion. The truncated conical surface 12 is adapted to be bonded to the flared lining of the pipe, which itself is adhered to that pipe. The precise bonding procedure may vary according to the nature of the plastic material and may include cementing, surface heating, or other conventional bonding procedures. As an example, a cemented bonding may be effected, as by means of a solvent cement 100 covering the respective surfaces as shown in FIG. 9, and following certain steps of preparation in accordance with the invention, as will later appear.

Figure 3:
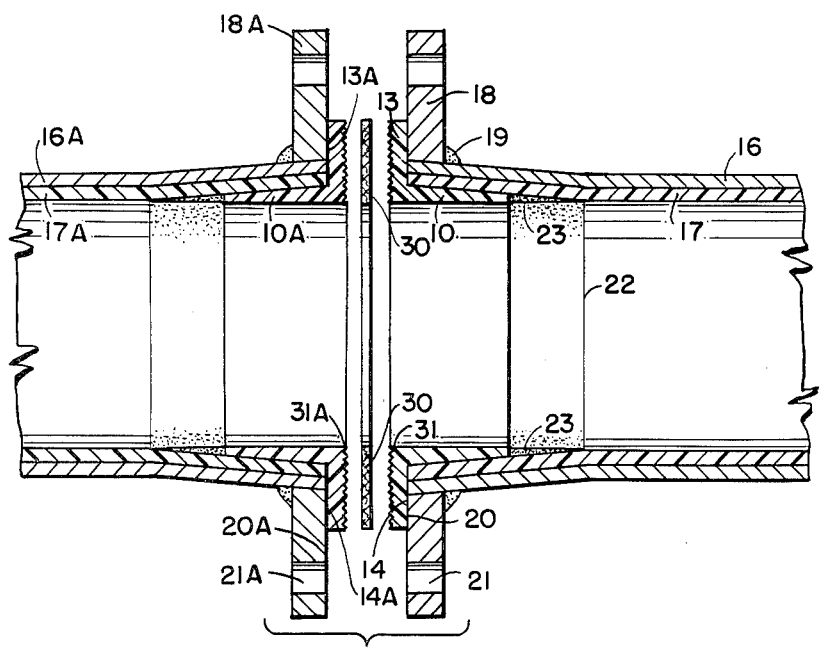
FIG. 3 is a longitudinal sectional view through the juxtaposed ends of a pair of pipes prepared in accordance with the invention and prior to fastening the same into the final flanged connection therebetween.
Figure 8:
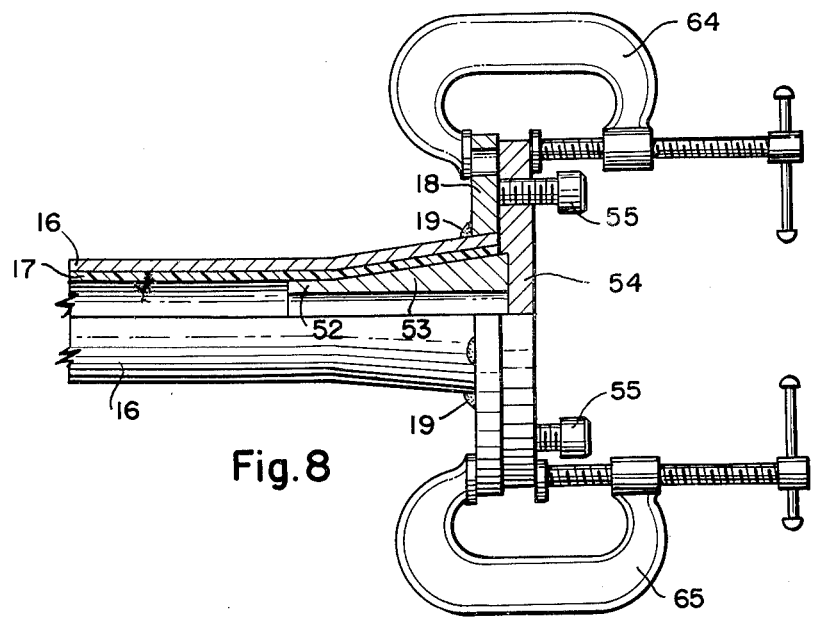
FIG. 8 is a view, partly in section, and partly in side elevation, showing the flaring plug in position within the pipe during the attachment of the metallic flange and the reducing of the restoring force in the flared plastic lining.

Extending generally normal to the axis of the run portion of the stub end and located at the end thereof, and integral therewith, is a flange portion 13, the back surface 14 of which is flat. The front surface 15 of the fiange preferably, but not necessarily, is outwardly tapered as best seen in FIG. 2, and in general a taper of about 1° is satisfactory. In addition, the surface 15 preferably, but not necessarily, is provided with concentric grooves, for example, about 0.015 inch deep and with a uniform pitch of about 0.03 inch. As seen in FIG. 3, the above described fitting is inserted, either at the factory or in the field, into the flared end of a lined pipe. This pipe may comprise an initially round structure, as shown in FIG. 6, having an outer tubular steel portion 16 and with an inner tubular plastic portion 17 therein and suitably adhered thereto. At its flared extremity the pipe is engaged by an annular back-up metallic flange 18 which may be suitably tapered at its center to embrace the flared end of the pipe. The metallic flange is welded as at 19 to the outer surface of the metallic pipe. This back-up flange provides a flat abutment surface 20 against which the surface 14 of the fitting contacts at the time of assembling the parts, the back of flange 18 having a greater diameter than the stub end flange, and including holes 21 through which bolts (not shown) may be passed to form the completed pipe joint.

As will be understood, the inner diameter of the plastic lining 17 of the pipe to the right of the peripheral line 22 (FIG. 3) is preferably equal to the inner diameter of the run portion of the stub end fitting. When a cementing bonding procedure is employed and as illustrated herein, any excess bonding material squeezed from its space between the surface 12 of the stub end and the flared inner surface of the pipe lining serves to fill in the periphery of the space immediately to the right of the end of the emplaced pipe fitting, as shown at 23, and without forming an obstruction to normal flow through the pipe. A typical lined piping system employing stub end fittings as above described may include two pipes similarly equipped with a stub end fitting and arranged in juxtaposed relation, similar portions of the second pipe being designated by characters with the suffix A. It will be further understood that the invention is applicable to pipe joints comprising a lined pipe connected to a lined pipe fitting, such as a lined T, and is not limited, therefore, to use with two lined pipes, as illustrated in FIG. 3. Although not generally required, a separate flat annular sealing gasket 30 of conventional material may be employed in the combination as shown in FIG. 3, if desired by the user. Having thus described the nature of the pipe joint and parts whose preparation the present invention is intended to assist, reference now is made to FIG. 4 showing the improved flaring apparatus. At the outset, it may be noted that the plastic lining 17 within the metallic pipe 16 is normally adhered thereto by various types of bonds, such as cemented bonds, mechanical bonds or the like, and that the thickness of, and modulus of resilience of, that layer of plastic is such as to establish an appreciable restoring force therein whenever the material is subjected to the flaring stresses and compression incident thereto. Without provision for reducing that restoring force, the plastic lining would tend to break its bond with the flared end of the metallic pipe, interfere with the proper insertion of the stub and fitting, and perhaps endanger the integrity of the sealed joint when corrosive materials are to be handled. The flaring apparatus and the method with which it is employed take this characteristic of the pipe lining into account as will now become apparent to those skilled in the art.

In its preferred form, the flaring apparatus or fixture is portable, may be handled by a single operator, and includes at one end a readily separable yoke having complementary identical sections 40 and 41. Each section is provided with an opening extending parallel to the axis of the pipe to be flared and receiving therethrough a threaded bolt 42 and 43, respectively, adapted to withstand the tension imposed during the flaring, and being held by suitable nuts. By means of removable cap screws in each yoke section engaging with the other yoke section, one such screw being shown at 44, these sections may be readily assembled into a unitary yoke member. Each section of the yoke is provided with a tapered arcuate central aperture complementary to the tapered aperture of the other yoke section, the larger diameters of which are located on the side from which the tension rods extend, and with these tapered apertures having diameters substantially greater than the diameter of the pipe to be flared. Insertable within these tapered apertures in the manner shown in FIG. 4, is a segmental collar or retainer having tapered outer surfaces corresponding to the taper of the apertures and with a series of axially spaced serrations or teeth on the inner periphery which engages the pipe. These teeth extend circumferentially and have a saw tooth edge providing biting contact with the pipe in the direction of pull of the tension rods. As seen in FIG. 5 the collar may conveniently comprise two complementary portions 45 and 46, respectively, having at their ends 47 and 48 of smaller outer diameter, semi-circular teeth 49 and 50, and with similar teeth as shown in FIG. 4 being disposed lengthwise of these portions.

Attached at the distal ends of the tension rods is a massive abutment member 51 extending transversely of the axis of the collar and spaced from that collar a sufficient distance to provide working space for the elements now to be described. A metallic flaring plug having a forwardly projecting tubular pilot or guide end 52, with an outer diameter not larger than, and preferably equal to, the inner diameter of the lining 17, includes a tubular body portion 53 of gradually increasing outer diameter extending from the pilot end to a cylindrical disc base or anvil portion 54. The diameter of this base, the forward flat surface 57 of which lies in a plane normal to the axis of the pipe, is generally large enough to provide ready clamping to the flange 18 and small enough to afford free movement between the spaced tension rods, while the thickness of the base is sufficient to withstand the flaring stress imposed thereon. At suitably spaced locations circumferentially of the base, a series of threaded holes are provided and within which retracting bolts 55 and 56 are threadedly engaged.

A conventional hydraulic jack having a cylinder 60 with an actuating fluid conduit 61 connected thereto is provided for use with the flaring plug. The jack, or equivalent extensible pressure applying member should be of adequate size and capacity to insure an uninterrupted flaring of the metallic pipe after such flaring is initiated. When arranged for flaring usage, the axis of the cylinder and of the piston 62 projecting therefrom coincide with the axis of the flaring plug and of the pipe to be flared, the base of the cylinder meanwhile resting in contact with the abutment 51.

With the foregoing description of the improved flaring apparatus in mind, the following description of the method of the invention and of the advantage to be secured through usage of that apparatus, will now indicate the utility of the same for preparing pipe joints employing the earlier described stub end fitting. With a metallic back-up flange 18 arranged in loose enveloping relation to the lined pipe and with the tapered central aperture 63 thereof arranged with its larger diameter facing the end of the pipe, the pilot and body portion of the flaring plug are then coated with a suitable silicone lubricant. The segmental collar portions 45 and 46 are engaged with the metallic pipe 16 at a suitable distance from the pipe end, a distance of 3–4 inches being generally suitable, and with these collar portions snugly engaging in the tapered recesses of the assembled yoke. The pilot portion of the plug is then carefully aligned in the lined pipe and the jack is inserted in position and actuated to bring its piston into contact with the base 54 of the plug. At this time the lining 17 and the plug occupy the relative positions seen in FIG. 6 and no restoring force has been built up in that lining. The operator then causes the piston of the jack to move forward slowly with an uninterrupted movement until the surface 57 of the plug contacts the end of the metallic pipe, as shown in FIG. 7, thus effecting the desired flare at the end of the pipe and placing the lining 17 at the flared end of the pipe under substantial compression loading, as related to any given increment of the lining confined radially of the pipe between the plug and the metallic pipe 15. In addition, as will be understood, the diameters of the lining and of the metallic pipe at the flared regions thereof have been increased and the lining considered as a whole has acquired a substantial stress in tension which may conveniently be termed its "restoring force." At this time the restoring force in the stressed lining reaches its maximum value and if the plug were immediately removed, would be sufficient to break the bond between that lining and the flared end of the metallic pipe. However, in accordance with the invention, the jack is merely actuated at this time in a rearward direction, relieving tension in rods 42 and 43 and permitting the fixture to be suitably disassembled and removed, while leaving the plug in position within the flared pipe. Promptly thereafter the operator moves the metallic flange 18 to the flared end of the pipe at which time the tapered central aperture 63 of the flange moves snugly into circumferential contact with the flared outer surface of the metallic pipe 16, and with the flat surface 20 of that flange extending at least to the end of the flared pipe. Suitable clamps as shown at 64 and 65 are then engaged with the back-up flange and the base 54 of the flaring plug to hold the same in rigid cooperation during the immediately following, and significant, welding step. This welding step preferably is conducted with a conventional welding apparatus using high-nickel content rods such as Eutetic Alloys 680 or one of the type 300 stainless steel electrodes which have the advantage of requiring relatively low amperage to make a good tack weld and which weld can be water quenched without cracking In carrying out the welding step, the operator first tack welds the flange 18, as at one of the welds 19, to the metallic pipe and immediately quenches the weld with water. During the application of the welding heat the compressed plastic lining is heated and undergoes a change of molecular structure which relieves the same of at least a portion of its restoring force, or memory-effect, the magnitude of this reduction in the restoring force being sufficient to avoid later breaking of the bond between that plastic lining and the flared end of the metallic pipe. The immediate cooling of the weld, moreover, prevents degradation of the plastic, which normally is of a thermoplastic nature. The second of the tack welds 19 is then made in similar manner at a location generally diametrical from the first weld, after which the clamps may be removed and a series of intermediate tack welds, about six spaced equidistantly, are then made in similar manner. Depending upon the plastic materials involved, and upon the rated loadings expected of the pipe joint, the described tack welding may suffice, or may be continued, with a quenching following each increment of additional weld until a complete weld extending circumferentially of the metallic pipe, if formed.

Following the described welding step and its concomitant treatment of the plastic lining, the flaring plug retracting bolts 55 and 56 are then carefully operated to withdraw the flaring plug axially from the flange-equipped flared pipe end leaving the same in readiness for mounting the stub end therein, as seen in FIG. 9, and without stressing the flared lining of the pipe, which lining remains bonded to that pipe. After the flaring plug is thus removed, the mating surfaces of the lined pipe and of the stub end may be wiped clean with a cloth moistened in methyl ethyl ketone in order to remove extraneous material, such as the silicone lubricant, after which those surfaces may be coated with the solvent cement 100, if a cemented bond is to be made. The stub end shown in FIG. 9 is then moved into the flared end of the pipe, given a rotation to insure even distribution of the cement, and thereafter a protective block (not shown) may be placed over the outer edge of the emplaced stub end and clamped to the flange 18 until the bond is hardened, a period of 15 minutes usually being sufficient for a hardening of that bond. As will be also noted, when the stub end is properly inserted in the pipe, the surface 14 of its flange abuts against the surface 20 of the metallic flange as best seen in FIG. 3, thus assuring the maintenance of the integrity of the bond with the pipe when the thus equipped pipe is incorporated into the piping system, as more fully set forth in the afore-mentioned McLaughlin application. The described apparatus is especially well adapted for flaring metallic pipes which tend to split under conditions of metal work-hardening. With the apparatus in place no interruption of the forward-flaring motion of the flaring plug is necessary, and when the jack 60 begins to apply its flaring pressure, it may continue to apply the same without pause until the completed flare is accomplished, thus minimizing the danger of splitting of the metallic pipe.

While I have shown and described particular method and apparatus embodiments of the invention, I do not desire the invention to be limited to the particular embodiments disclosed, but rather I intend by the appended claims to cover all modifications within the true spirit and scope of the invention.

What is claimed is:

1. Apparatus for flaring the end of a plastic lined metallic pipe with the lining bonded thereto and comprising in combination, a demountable assembly adapted for temporary support upon the end of the pipe during the flaring of the pipe and including a yoke having a central truncated conically shaped aperture for surrounding said pipe in spaced relation thereto and with its larger diameter nearer that end of said pipe which is to receive the flare, a segmental pipe-engaging-collar having a plurality of separate arcuate sections, each section having a tapered outer surface engageable in mating relation with the aperture in said yoke and having a serrated inner surface engageable with a portion of the periphery of said pipe adjacent the end of the pipe which serves as a support for said assembly, an abutment member extending transversely of said pipe and located sufficiently far from the end thereof to provide an open working space therebetween, means rigidly and adjustably connecting said abutment to said yoke and completing the detachable assembly supported by said pipe; a flaring plug having a base portion, a cylindrical guide portion with an outer diameter no greater than the inner diameter of the uncompressed lining of said pipe, and a tapered flaring portion connecting said base and guide portions; and an extensible pressure-applying member separate from said plug and said abutment and located in said open space and adapted to push upon each of said abutment and said base portion of said plug during the flaring operation, said extensible member being adapted when moved in an extending direction to force said plug into said pipe and to impose tension upon said connecting means and when moved in a contracting direction to relieve said tension whereby said yoke, collar, and abutment may be removed from their temporary support upon said pipe, thus to leave said plug in place within said pipe in order to maintain compression upon the plastic lining in the flared end of said pipe.

2. Apparauts as defined in claim 1 wherein said yoke comprises a pair of complementary members detachably secured to each other, and said connecting means includes a pair of tension rods, one end of each rod being connected to each of the respective members of the yoke and the other end thereof being connected to said abutment member.

3. Apparatus as defined in claim 1 wherein said base portion of said flaring plug includes a forwardly disposed flat surface normal to the axis of said plug and laterally extending from the rearmost portion of said tapered portion of said plug, and adapted to contact the end of said pipe when said plug is fully inserted therein.

4. Apparatus as defined in claim 1 wherein said base portion of said flaring plug includes means mounting a retracting means for withdrawing said plug from the flared end of said pipe.

References Cited by the Examiner

UNITED STATES PATENTS 2,209,739 7/1940 Meyer _____ 72—370
2,535,470 12/1950 Welshman _____ 72—370
3,086,575 4/1963 Knowal _____ 72—370

CHARLES W. LANHAM, *Primary Examiner.*

RICHARD J. HERBST, *Examiner.*